United States Patent
Wang

(10) Patent No.: US 10,684,216 B2
(45) Date of Patent: Jun. 16, 2020

(54) MULTI-SPECTRAL GAS QUANTIFICATION AND DIFFERENTIATION METHOD FOR OPTICAL GAS IMAGING CAMERA

(71) Applicant: Konica Minolta Laboratory U.S.A., Inc., San Mateo, CA (US)

(72) Inventor: Leiming Wang, Foster City, CA (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 84 days.

(21) Appl. No.: 15/942,097

(22) Filed: Mar. 30, 2018

(65) Prior Publication Data

US 2019/0302013 A1    Oct. 3, 2019

(51) Int. Cl.
 *G01N 21/31* (2006.01)
 *G01N 21/3504* (2014.01)
 *G01M 3/38* (2006.01)

(52) U.S. Cl.
 CPC ............ *G01N 21/314* (2013.01); *G01M 3/38* (2013.01); *G01N 21/3504* (2013.01);
 (Continued)

(58) Field of Classification Search
 CPC ........ G08B 21/12; G08B 21/282; H04N 5/33; H04N 5/332; G06K 9/2018; G06K 9/4461;
 (Continued)

(56) References Cited

U.S. PATENT DOCUMENTS

| | | | | |
|---|---|---|---|---|
| 5,001,346 A | * | 3/1991 | Barkhoudarian | ....... G01M 3/38 250/330 |
| 5,430,293 A | * | 7/1995 | Sato | ........ G01M 3/38 250/330 |

(Continued)

FOREIGN PATENT DOCUMENTS

| | | | |
|---|---|---|---|
| WO | 2017/104607 A1 | 6/2017 | |
| WO | WO-2017183558 A1 | * 10/2017 | ......... G01N 21/3504 |

OTHER PUBLICATIONS

Berkson, Emily E., "A Proposed Imaging System to Spatially and Temporally Monitor Unburned Hydrocarbons in Jet Engine Exhaust" (2016).Thesis. Rochester Institute of Technology. 116 pages. (Year: 2016).*

(Continued)

*Primary Examiner* — Gordon J Stock, Jr.
(74) *Attorney, Agent, or Firm* — Osha Liang LLP

(57) ABSTRACT

A gas concentration-length quantification method may include: acquiring a multi-spectral image of detected radiance including a plurality of pixels using a multi-spectral optical gas imaging camera; estimating a background radiance for at least one of the pixels; calculating a gas concentration-length for the at least one of the pixels based on the detected radiance and the estimated background radiance; and triggering an alert when each alert condition in a list of alert conditions is satisfied. A multi-spectral configuration of the camera may include a reference band that is outside an absorption window of a target gas and an active (Continued)

band that includes at least a portion of the absorption window. Estimating the background radiance may include determining a model relating a detected radiance of the active band to a detected radiance of the reference band and using the model to estimate the background radiance for the active band.

24 Claims, 9 Drawing Sheets

(52) U.S. Cl.
CPC ............... *G01N 2021/3531* (2013.01); *G01N 2021/3545* (2013.01); *G06T 2207/10048* (2013.01)

(58) Field of Classification Search
CPC . G01K 2013/024; G01K 13/02; G01J 5/0014; G01J 5/06; G01J 2005/0048; G01J 2005/0051; G01J 2005/0055; G01J 2005/0059; G01J 2005/0062; G01J 2005/0077; G01J 2005/0081; G01J 2005/0085; G01J 2005/067; G01J 2005/068; G06T 2207/10048; G06T 7/0002; G06T 7/0004; G06T 7/0008; G06T 7/001; G01M 3/002; G01M 3/38; G01M 3/007; G01M 3/02; G01M 3/04; G01N 33/0004; G01N 33/0006; G01N 33/0008; G01N 33/0031; G01N 33/0032; G01N 33/0047; G01N 33/0049; G01N 33/0059; G01N 33/006; G01N 33/0063; G01N 33/0065; G01N 21/314; G01N 21/35; G01N 21/3504; G01N 21/3518; G01N 21/3554; G01N 21/3581; G01N 21/359; G01N 2021/3155; G01N 2021/3188; G01N 2021/3531; G01N 2021/3509; G01N 2021/3514; G01N 2021/3522; G01N 2021/3527; G01N 2021/1714; G01N 2021/1765; G01N 2021/1795; G01N 2021/3129; G01N 2021/8578
See application file for complete search history.

(56) References Cited

U.S. PATENT DOCUMENTS

| | | | | |
|---|---|---|---|---|
| 6,958,466 | B1* | 10/2005 | Stein | G06K 9/0063 250/208.1 |
| 7,486,399 | B1* | 2/2009 | Reichardt | G01M 3/20 250/330 |
| 7,687,776 | B2* | 3/2010 | Baliga | G01J 3/02 250/338.1 |
| 8,280,111 | B2* | 10/2012 | Kukshya | G06K 9/0063 382/103 |
| 8,284,986 | B2* | 10/2012 | Wolowelsky | G01N 21/3518 382/100 |
| 8,305,575 | B1* | 11/2012 | Goldstein | G01J 3/021 356/326 |
| 8,548,271 | B2* | 10/2013 | Grimberg | G01M 3/002 382/294 |
| 9,258,495 | B2* | 2/2016 | Zeng | H04N 5/332 |
| 9,325,915 | B2* | 4/2016 | Zeng | H04N 5/33 |
| 9,927,356 | B2* | 3/2018 | Skibo | G01N 21/39 |
| 10,031,040 | B1* | 7/2018 | Smith | G01M 3/007 |
| 10,073,030 | B2* | 9/2018 | Morimoto | G01N 21/3504 |
| 10,145,788 | B2* | 12/2018 | Asano | G06T 5/10 |
| 10,190,975 | B2* | 1/2019 | Tsuchiya | G01M 3/38 |
| 10,190,976 | B2* | 1/2019 | Waxman | G01J 3/42 |
| 10,234,380 | B1* | 3/2019 | Wang | G01M 3/38 |
| 10,359,359 | B2* | 7/2019 | Wang | G06T 7/0004 |
| 10,416,076 | B2* | 9/2019 | Sandsten | G01N 21/3504 |
| 10,422,741 | B2* | 9/2019 | Sandsten | G01J 3/45 |
| 2002/0036266 | A1 | 3/2002 | Dreyer et al. | |
| 2006/0220888 | A1* | 10/2006 | Germouni | G01J 5/522 340/605 |
| 2010/0145659 | A1* | 6/2010 | Busch | G01J 3/28 702/190 |
| 2016/0097713 | A1* | 4/2016 | Kester | G01N 21/3504 356/51 |
| 2017/0045443 | A1* | 2/2017 | Wang | G01N 21/3504 |
| 2017/0358190 | A1* | 12/2017 | Au | G08B 17/125 |
| 2019/0137386 | A1* | 5/2019 | Morimoto | G01K 13/02 |
| 2019/0154536 | A1* | 5/2019 | Wang | G01M 3/047 |
| 2019/0187020 | A1* | 6/2019 | Green | G01M 3/16 |

OTHER PUBLICATIONS

Burr, Tom et al., "Overview of Physical Models and Statistical Approaches for Weak Gaseous Plume Detection using Passive Infrared Hyperspectral Imagery," Dec. 6, 2006, Sensors, 6, pp. 1721-1750. (Year: 2006).*
Chilton, Lawrence et al., "Detection of Gaseous Plumes using Basis Vectors," Apr. 27, 2009, Sensors, 9, pp. 3205-3217. (Year: 2009).*
Idoughi, Ramzi et al., "Background Radiance Estimation for Gas Plume Quantification for Airborne Hyperspectral Thermal Imaging," 2016, Hindawi Publishing Corporation, Journal of Spectroscopy, vol. 2016, Article ID 5428762, 17 pages. (Year: 2016).*
Manolakis, Dimitris et al., "A Taxonomy of Algorithms for Chemical Vapor Detection with Hyperspectral Imaging Spectroscopy," May 12, 2005, Proc. SPIE 5795, Chemical and Biological Sensing VI, pp. 125-133. (Year: 2005).*
Niu, Sidi et al., "Hyperspectral chemical plume quantification via background radiance estimation," May 18, 2013, Proc. SPIE 8743, Algorithms and Technologies for Multispectral, Hyperspectral, and Ultraspectral Imagery XIX, 874316, 12 pages. (Year: 2013).*
Truslow, Eric et al., "Chemical plume detection with an iterative background estimation technique," May 17, 2016, Proc. SPIE 9840, Algorithms and Technologies for Multispectral, Hyperspectral, and Ultraspectral Imagery XXII, 98401M, 14 pages. (Year: 2016).*

\* cited by examiner

MULTI-SPECTRAL GAS QUANTIFICATION AND DIFFERENTIATION METHOD FOR OPTICAL GAS IMAGING CAMERA

BACKGROUND

In recent years, infrared (IR) optical gas imaging (OGI) cameras have been extensively used for gas leakage detection and monitoring due to better visualization of gas leaks, reduced inspection time, and improved safety as compared to conventional gas sensing techniques, such as catalytic detectors.

In addition to the practical qualitative use of IR OGI cameras, quantitative use has been suggested. For example, it is possible to quantify a gas concentration-length (a concentration integrated along a path length, e.g., in units of parts per million-meter, or ppm·m) of an imaged plume with appropriate calibration. The gas concentration-length may also be referred to as a gas concentration path length (CPL).

IR OGI is one of two methods recognized by the U.S. Environmental Protection Agency (EPA) for gas Leak Detection and Repair (LDAR) surveys in the U.S. oil and gas industry, the second being EPA Method 21.

SUMMARY

This summary is provided to introduce a selection of concepts that are described further in the detailed description below. This summary is not intended to identify key or essential features of the claimed subject matter, nor is it intended to be used as an aid in limiting the scope of the claimed subject matter.

In one or more embodiments of the present invention, a gas concentration-length quantification method may include acquiring a multi-spectral image of detected radiance comprising a plurality of pixels using a multi-spectral optical gas imaging (OGI) camera; estimating a background radiance for at least one of the pixels; calculating a gas concentration-length for the at least one of the pixels based on the detected radiance and the estimated background radiance; and triggering an alert when each alert condition in a list of alert conditions is satisfied. The list of alert conditions may include the gas concentration-length for at least one pixel exceeding a gas threshold level. A multi-spectral configuration of the multi-spectral OGI camera may include a reference band that is outside an absorption window of a target gas and an active band that includes at least a portion of the absorption window of the target gas. Estimating the background radiance may include: determining a model relating a detected radiance of the active band to a detected radiance of the reference band, and using the model as a calibration model to estimate the background radiance for the active band with or without the presence of a target gas.

In one or more embodiments of the present invention, a gas concentration-length quantification system may include a multi-spectral optical gas imaging (OGI) camera and a processing unit connected to the multi-spectral OGI camera. The processor may perform: reading an image comprising a plurality of pixels; estimating a background radiance for at least one of the plurality of pixels; calculating a gas concentration-length for the at least one of the plurality of pixels based on the image and the background radiance; and triggering an alert when the gas concentration-length for at least one pixel exceeds a gas threshold level. A multi-spectral configuration of the multi-spectral OGI camera may include a reference band that is outside an absorption window of a target gas and an active band that includes at least a portion of the absorption window of the target gas. Estimating the background radiance may include determining a model relating a detected radiance of the active band to a detected radiance of the reference band and using the model as a calibration model to estimate the background radiance for the active band with or without the presence of a target gas.

In one or more embodiments of the present invention, a non-transitory computer readable medium (CRM) storing computer readable program code embodied therein that may: reads an image comprising a plurality of pixels; estimate a background radiance for at least one of the plurality of pixels; calculate a gas concentration-length for the at least one of the plurality of pixels based on the image and the background radiance; and trigger an alert when the gas concentration-length for at least one pixel exceeds a gas threshold level. A multi-spectral configuration of the multi-spectral OGI camera may include a reference band that is outside an absorption window of a target gas and an active band that may include at least a portion of the absorption window of the target gas. Estimating the background radiance may include determining a model relating a detected radiance of the active band to a detected radiance of the reference band and using the model as a calibration model to estimate the background radiance for the active band with or without the presence of a target gas.

Other aspects and advantages will be apparent from the following description and the appended claims.

BRIEF DESCRIPTION OF DRAWINGS

Embodiments of the invention will be described with reference to the accompanying drawings. However, the accompanying drawings illustrate only certain aspects or implementations of one or more embodiments of the invention by way of example and are not meant to limit the scope of the claims.

DETAILED DESCRIPTION

Figure 1A:
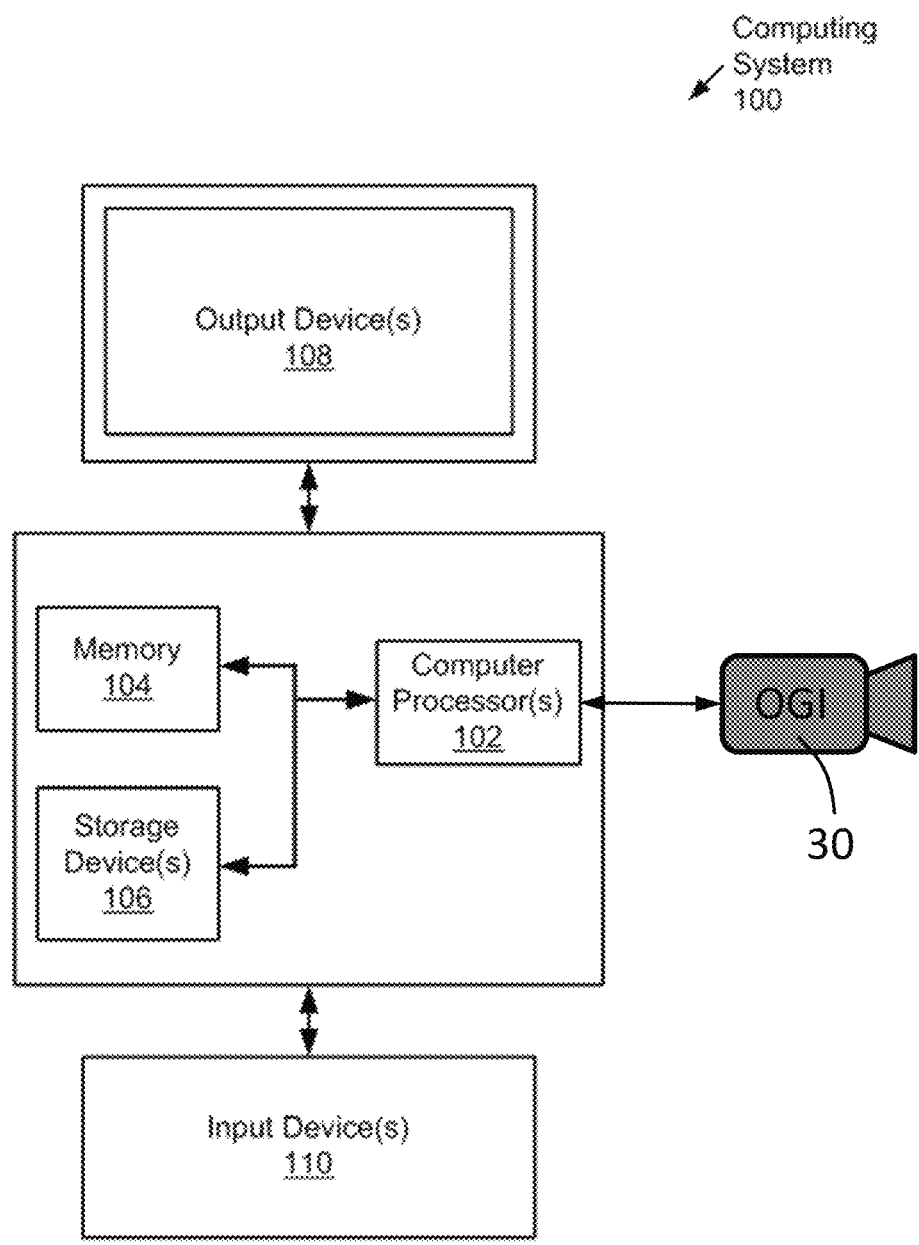
FIGS. 1A-1C show gas concentration-length quantification systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide for a method, a system, and a non-transitory computer readable medium for quantifying gas concentration-length using an image acquired with a camera by subtracting a background radiance from a measured radiance where the background radiance is estimated by using at least one active band and one reference band of a spectrum of the image. The spectral range may cover any suitable range of wavelengths. In one or more embodiments, a mid-wave infrared (MWIR) range of $3\times10^{-6}$ m to $5\times10^{-6}$ m may be used. One or more embodiments may use the long-wave infrared (LWIR) range of $7\times10^{-6}$ m to $14\times10^{-6}$ m. Both MWIR and LWIR are useful for hydrocarbon gas detection applications. In one or more embodiments, the camera is an optical gas imaging camera sensitive to infrared radiation.

One or more embodiments of the invention provide a method for reducing false alarms by differentiating between a target gas and a contaminant gas.

FIG. 1A shows a gas concentration-length quantification system in accordance with one or more embodiments of the invention. An optical gas imaging (OGI) camera 30 may be connected to one or more computer processors 102. In one or more embodiments, the OGI camera 30 is a multi-spectral OGI camera. The connection between the OGI camera 30 and computer processors 102 may be made with wires or wirelessly. The one or more processors may be included in a computing system 100.

Embodiments of the invention may be implemented using virtually any type of computing system 100, regardless of the platform being used. For example, the user computing devices may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 1A, the computing system 100 may include one or more processor(s) 102, associated memory 104 (e.g., random access memory (RAM), cache memory, flash memory, etc.), one or more storage device(s) 106 (e.g., a hard disk, an optical drive such as a compact disk (CD) drive or digital versatile disk (DVD) drive, a flash memory stick, etc.), and numerous other elements and functionalities. The processor(s) 102 may be an integrated circuit for processing instructions. For example, the processor(s) 102 may be one or more cores, or micro-cores of a processor.

The computing system 100 may also include one or more input device(s) 110, such as a touchscreen, keyboard, mouse, microphone, touchpad, electronic pen, or any other type of input device. Further, the computing system 100 may include one or more output device(s) 108, such as a screen (e.g., a liquid crystal display (LCD), a plasma display, touchscreen, cathode ray tube (CRT) monitor, projector, or other display device), a printer, external storage, or any other output device. One or more of the output device(s) 108 may be the same or different from the input device(s). The output device(s) 108 may include a light, for example a flashing red light, a horn, a buzzer, or the like that may be used as an alert when a gas concentration-length exceeds a gas threshold level. The output device(s) may generate and/or receive a facsimile (fax), an email, a Short Message Service (SMS) text, or the like. In one or more embodiments, the alert may be suppressed when a pre-set species differentiation threshold is exceeded indicating a contaminant gas at a level sufficient to distort gas concentration-length measurements and producing a false alarm.

Figure 1B:
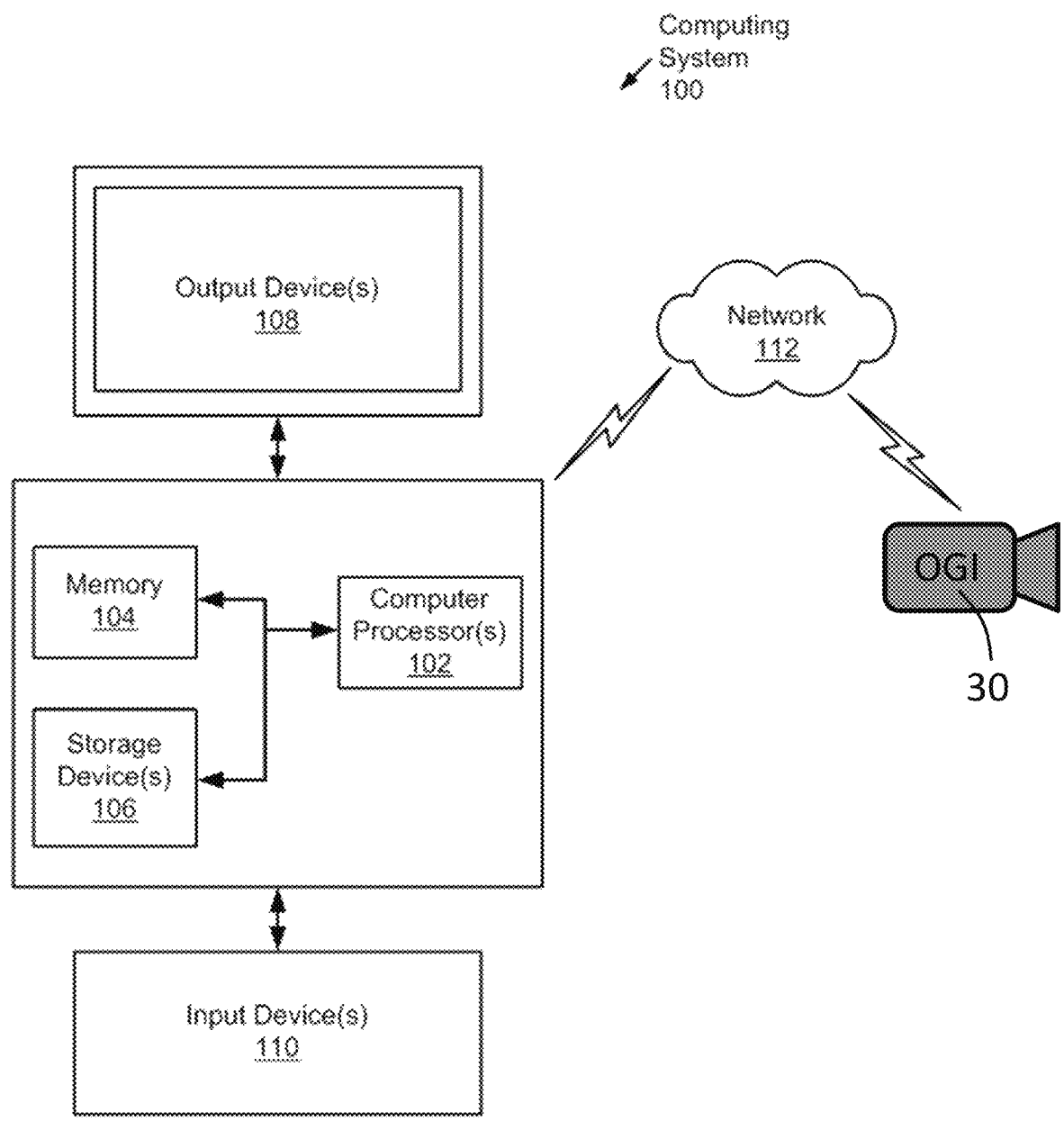

FIG. 1B shows that, in accordance with one or more embodiments, the computing system 100 may be connected to a network 112 (e.g., a local area network (LAN), a wide area network (WAN) such as the Internet, mobile network, or any other type of network) via a network interface connection (not shown). The input and output device(s) may be locally or remotely (e.g., via the network 112 connected to the processor(s) 102, memory 104, and storage device(s) 106. The OGI camera 30 may be connected to one or more computer processors 102 by the network 112. Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s) 102, performs one or more embodiments of the invention. Also, all discussed steps performed by a processor executing software instructions may, in one or more embodiments, be in the form of hardware such as circuitry. Those skilled in the art will appreciate that the hardware may be comprised of application-specific integrated circuits or other appropriate circuitry.

Further, one or more elements of the aforementioned computing system 100 may be located at a remote location and connected to the other elements over a network 112. Further, one or more embodiments of the invention may be implemented on a distributed system having a plurality of nodes, where each portion of the invention may be located on a different node within the distributed system. In one or more embodiments of the invention, the node corresponds to a distinct computing device. Alternatively, the node may correspond to a processor with associated physical memory. The node may alternatively correspond to a processor or micro-core of a processor with shared memory and/or resources.

Figure 1C:
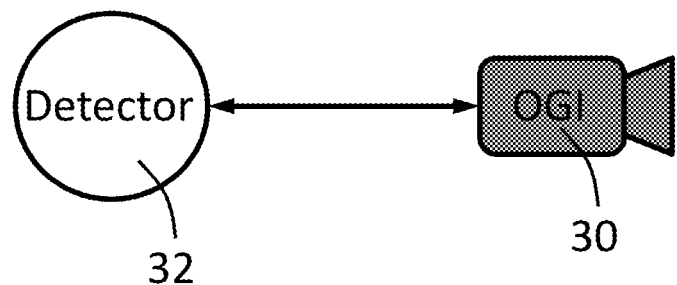

FIG. 1C shows an OGI camera 30 connected to a detector 32 in accordance with one or more embodiments. The detector may be of the type commonly used in residential or industrial settings, such as a temperature meter, humidity meter, or the like. The connection may be wired or wireless and may include a connection via a network. In one or more embodiments, the detector 32 may be integrated into the OGI camera. In one or more embodiments, the OGI camera 30 may be integrated on an integrated circuit.

In one or more embodiments, the OGI camera 30 may be used to capture images for gas concentration-length quantification from commercial, industrial, marine, residential, or rural environments, among others.

Figure 2:
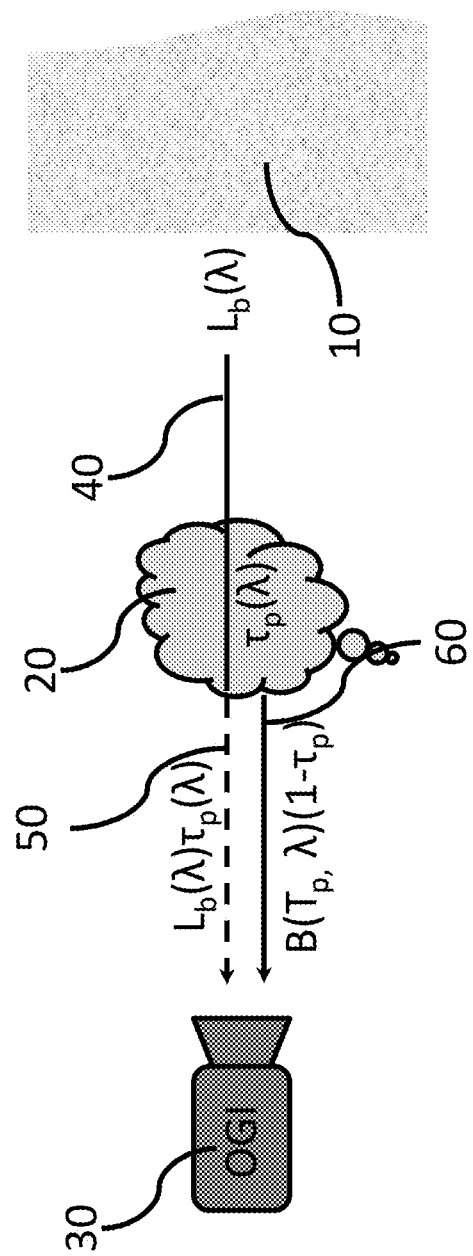
FIG. 2 is a schematic diagram showing the radiative transfer model mechanism of gas detection and quantification in accordance with one or more embodiments of the invention.

FIG. 2 shows a schematic diagram of gas leak imaging by OGI and the physical basis (known as the radiative transfer model) for gas concentration-length (thickness or length integrated concentration, e.g., in units of parts per million-meter, or ppm·m) quantification in accordance with one or more embodiments. An OGI camera 30 may be equipped with at least one longpass filter that passes at least a portion of the absorption band of the target gas. The OGI camera 30 may also be equipped with a reference band longpass filter that does not pass the absorption band of the target gas. A longpass filter is a filter that transmits light above certain wavelengths. In one or more embodiments, the OGI camera 30 may be equipped with a different type of filter, for example a shortpass filter or a bandpass filter. The target gas may be, for example, methane, sulfur hexafluoride, carbon monoxide, and carbon dioxide, among others. One or more of these target gases may be detected, for example, in an oil and gas industry setting. However, one or more embodiments of the present invention may be applied to other settings, for example, including residential settings.

As illustrated in FIG. 2, radiance 40 from the background 10, $L_b(\lambda)$, where $\lambda$ denotes the wavelength of the radiation, passes through a gas plume 20, where the intensity of the radiance from the background 40 may be attenuated by gas absorption. The absorption by gas plume 20 may be characterized by a transmittance coefficient $\tau_p(\lambda)$ so that the transmitted radiance 50 reaching the OGI camera 30 becomes $L_b(\lambda)\tau_p(\lambda)$. The transmittance coefficient $\tau_p(\lambda)$ is related to the gas concentration-length $\gamma$ through the Beer-Lambert law: $\tau_p(\lambda)=\exp(-\gamma\alpha(\lambda))$, wherein the absorbance spectrum $\alpha(\lambda)$ is unique and known for each gas species.

Meanwhile, according to one or more embodiments, the infrared-absorbing gas plume 20 also radiates thermal energy 60, which is characterized by the product of the blackbody radiation (Planck function) $B(T_p, \lambda)$ at the temperature of the gas $(T_p)$ and the emissivity of the gas $(1-\tau_p)$. Thus, in one or more embodiments, the OGI camera 30 may record the background radiance $L_b(\lambda)$ modulated by the gas plume 20 absorption as given in Eqn. (1):

$$L_{detected}(\lambda)=L_b(\lambda)\tau_p(\lambda)+B(T_p, \lambda)(1-\tau_p(\lambda)) \quad (1)$$

Depending on the relative temperature difference between the gas plume 20 and the background 40, the gas plume 20 may be visualized as dark or bright contrast against the background 40 in an image.

The simplified radiative transfer equation (1) also may provide the physical basis for quantification of the transmittance coefficient $\tau_p(\lambda)$, and subsequently quantification of the concentration-length of the gas plume 20, provided that $L_b(\lambda)$ and $B(T_p, \lambda)$ are known in Eqn. (1). $B(T_p, \lambda)$ may be readily obtained by measuring the temperature of the gas plume 20 and calculating with the Planck function. Thus, obtaining the background radiance $L_b(\lambda)$ may be a key challenge for gas concentration-length quantification in optical gas imaging (OGI).

In one or more embodiments of the present invention, a method for background radiance estimation in an optical gas image may use a multi-spectral approach using a plurality of filters and machine learning techniques, and the gas concentration-length quantification process based on that. With this method, a background image may be analytically generated.

Thus, one or more embodiments of the present invention may have the advantage of allowing the estimation of background radiance, and thus quantification of the gas-concentration length, in the presence of a gas plume. Advantageously, one or more embodiments of the present invention may provide reliable background radiance estimation under wide range of environmental conditions.

Figure 3:
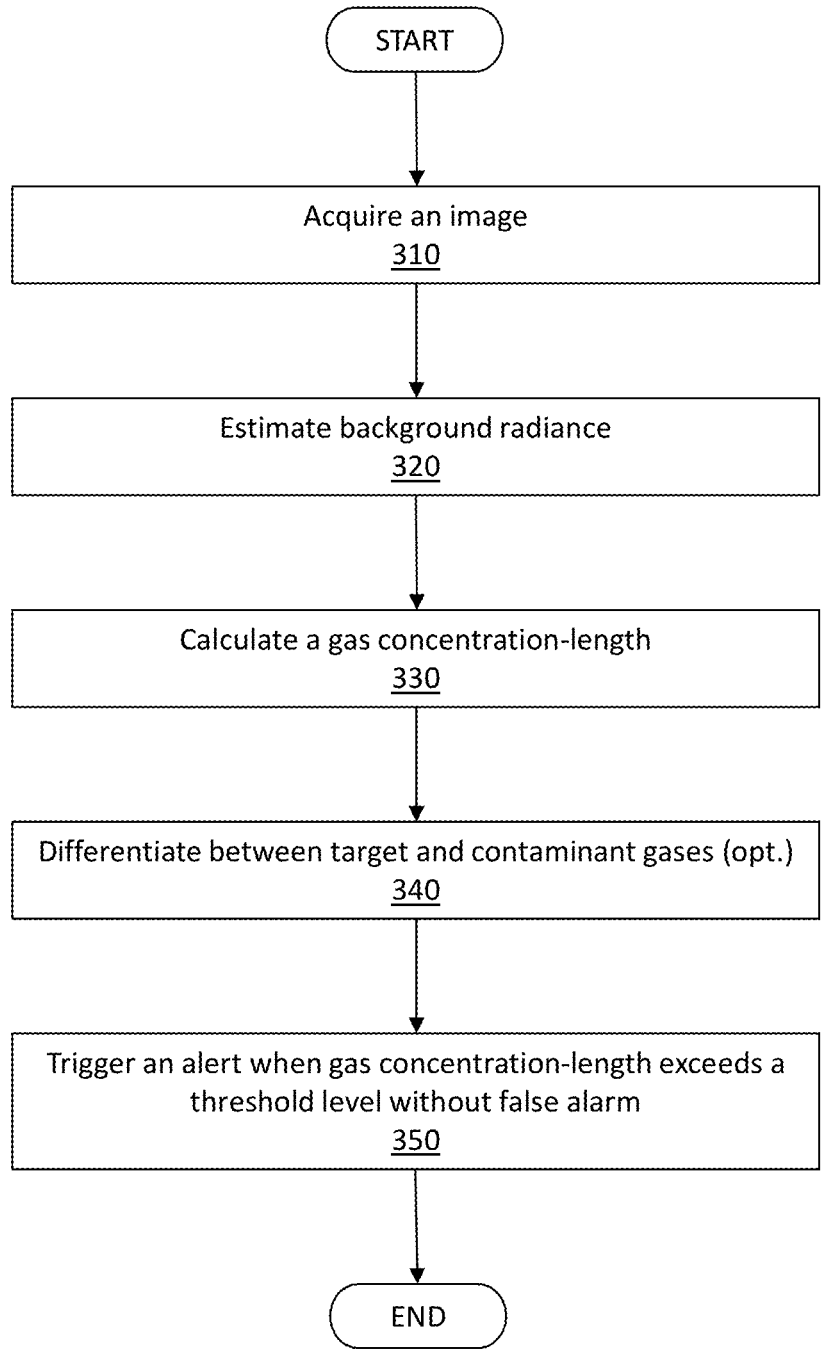
FIG. 3 is a flowchart of a gas concentration-length quantification method in accordance with one or more embodiments of the invention.

FIG. 3 is a flowchart describing a method of gas concentration-length quantification based on a background radiance estimation using a multi-spectral method according to one or more embodiments. In one or more embodiments of the invention, one or more of the steps shown in FIG. 3 may be omitted or repeated, and additional steps may also be taken. Accordingly, the scope of the invention should not be considered limited to the specific arrangement of steps shown in FIG. 3.

In step 310, an image is acquired. The image may include gas plume or not. In one or more embodiments, the image may be an infrared image acquired by an OGI camera. For clarity of discussion and to distinguish the image from other images, the image will be referred to hereinafter as an infrared (IR) image. However, the term is not intended to restrict to the image being infrared. It is readily apparent that images of other radiation wavelengths may be included. A single IR image may be acquired, or a sequence of IR images may be acquired as with a sequence of video image frames. The pixel intensities in the IR image may be calibrated to represent either the temperature or the radiance value of the scene using known calibration data of the OGI camera.

In step 320, the method estimates the background radiance using an analytical model derived from simulated data and/or experimental measurements. The background radiance estimation may be based on input of known air temperature, background temperature, background reflectivity, and the like environmental parameters. The analytical model for background radiance estimation may be derived using machine learning on simulation data or experimental measurement data of the individual band-integrated radiance from a background scene for various background materials' thermal properties and a wide range of environmental conditions. A background scene herein refers to a background image without the presence of target or contaminant gas. Thermal properties may include reflectance, emissivity, and the like. Environmental conditions may include temperature of the background materials, temperature of the air, temperature difference between the background materials and the air, sunlight condition, and the like.

In step 330, the method calculates a gas concentration-length at each pixel using the data of the IR image and the estimated background radiance. In one or more embodiments, the gas temperature may be measured with a thermometer or may be assumed to be at the same as the temperature of the ambient air.

The calculation of a gas concentration-length may be based on the radiative transfer model as described above, and may use the procedure disclosed in PCT Patent Publication No. WO2017104607 A1.

In step 340, the method differentiates between a target gas and at least one contaminant gas.

In one or more embodiments, the method described with reference to the flowchart in FIG. 3 may repeat steps 310 through 350 a plurality of times in order to process a plurality of images such as may be generated by a video stream.

In step 350, the method triggers an alert when the gas concentration-length of at least one pixel exceeds a gas threshold level. An alert may take many forms and may include a plurality of forms. One of the forms of alert may be a colored light, e.g., a red light, on a user console. The light may illuminate and/or flash. An alert may be audible, e.g., a bell, a siren, a horn, or the like. An alert may be an email, a facsimile (fax), a Short Message System (SMS) text message, a telephone communication, or the like. An alert may display on a computer display, a mobile device, a mobile phone, or the like. An alert may be provided to one or more locations and/or one or more users. An alert may be transmitted through a wired and/or a wireless system or network. The alert may be directed to a user and/or to another device that may automatically perform one or more functions is response to the alert.

Figure 4:
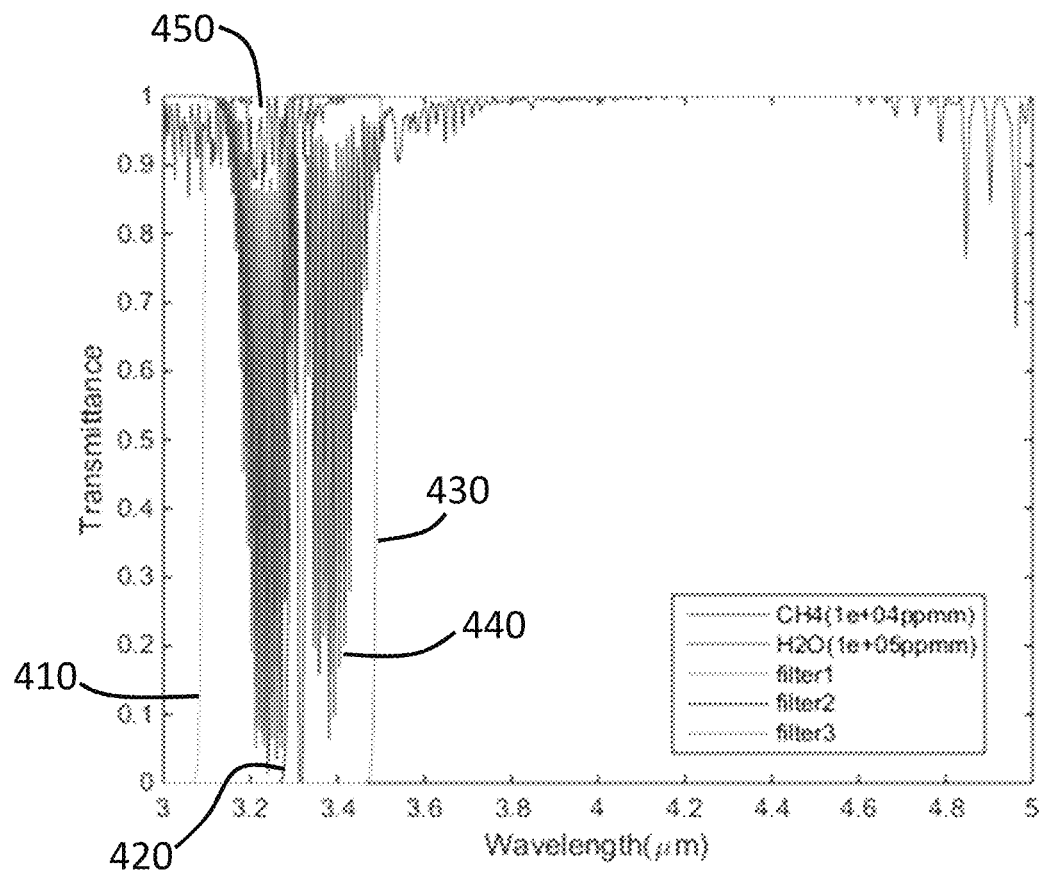
FIG. 4 shows simulated transmittance spectra of methane ($CH_4$) and water vapor ($H_2O$) and an example three-band configuration for a mid-wave infrared (MWIR) multi-spectral OGI system in accordance with one or more embodiments of the invention.
Figures 5A, 5B:
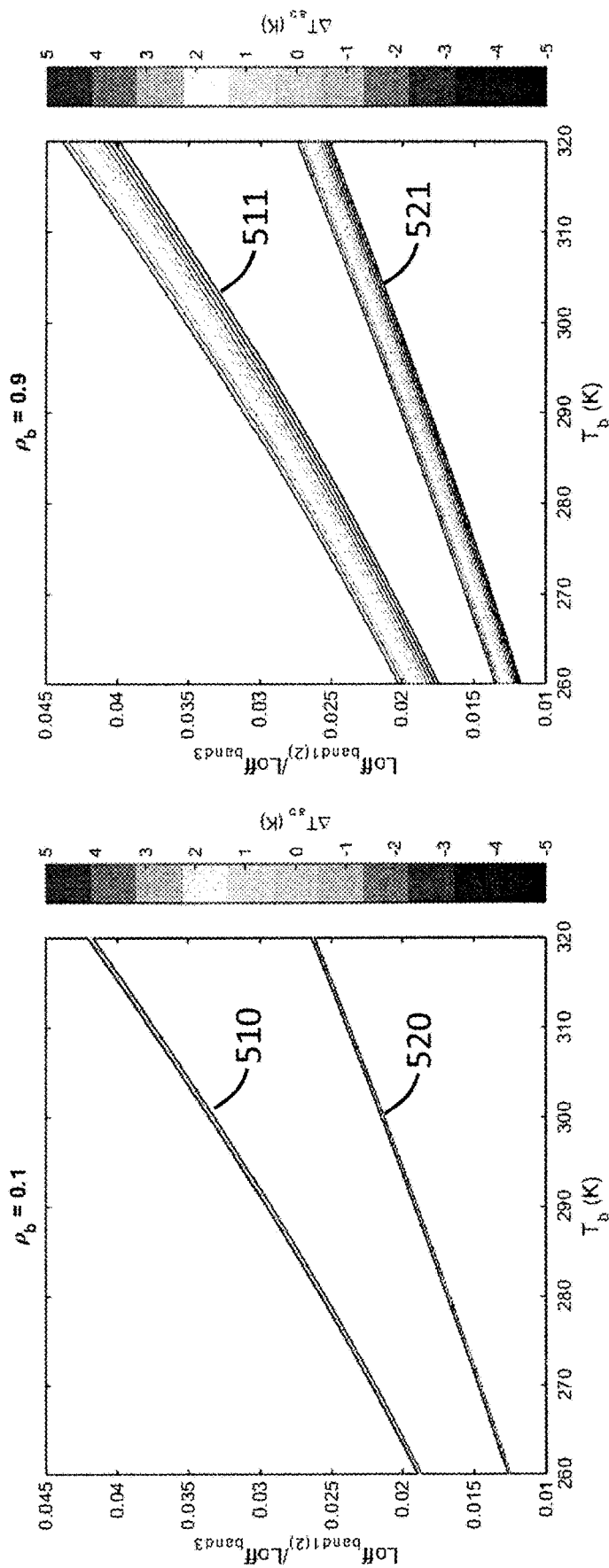
FIGS. 5A and 5B show simulated radiance ratios between an active band and a reference band in accordance with one or more embodiments of the invention.
Figure 6:
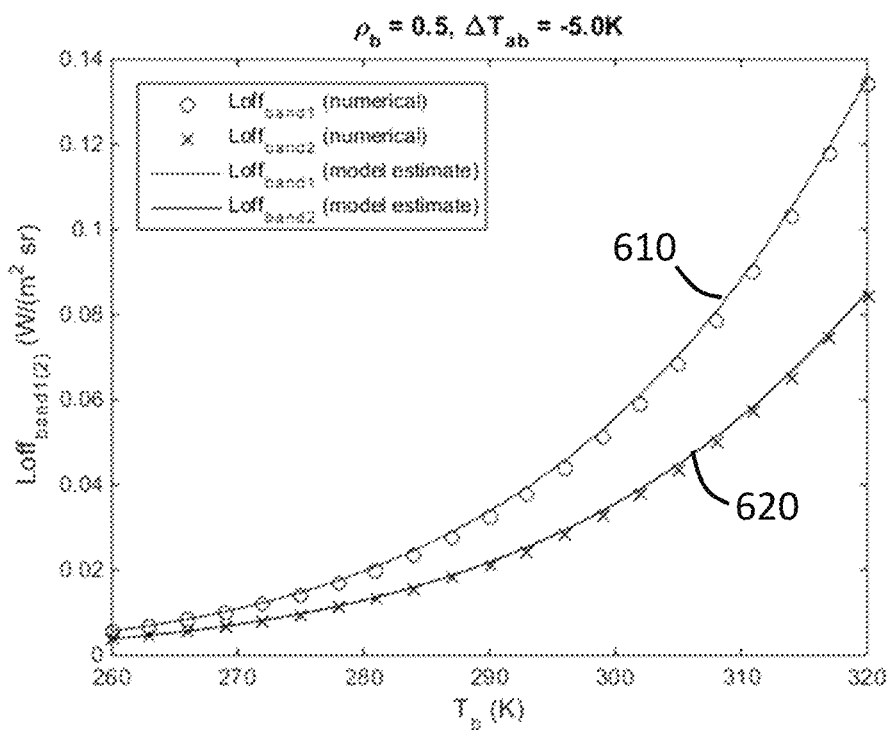
FIG. 6 shows an analytical model-estimated radiance for two active bands based on the reference band radiance. The estimated radiance is compared with the numerical results based on Planck's law in accordance with one or more embodiments of the invention.

FIG. 4-FIG. 6 presents a simulated example of the process of background radiance estimation using analytical model, as in step 320 in FIG. 3. FIG. 4 presents simulated transmittance spectra for methane ($CH_4$) 440 and water vapor ($H_2O$) 450 in one or more embodiments. Also presented are three longpass filters 410, 420, 430 that may be used in a three-band configuration for a mid-wave infrared (MWIR) multi-spectral OGI, where a three-band configuration is one example of a multi-spectral configuration. A person of ordinary skill in the art will readily perceive that a multi-spectral configuration may comprise two or more bands. Using the three longpass filters, three bands may be constructed. A first active band may be described as the band passed by filter 410 minus that passed by filter 430. Similarly, a second active band may be described as the band passed by filter 420 minus that passed by filter 430. A reference band may be described as that which is passed by filter 430 and being located outside the absorption window of the target gas such as methane 440 in this example. With regard to the present disclosure, the phrase "located outside the absorption window" does not indicate a region entirely free of absorption, but only a relatively small amount of absorption may occur in the region. A person of ordinary skill in the art will readily appreciate such an understanding.

In one or more embodiments, the background radiance as in FIG. 2 may be simulated as given in Eqn. (2):

$$L_b(\lambda) = \rho_b(\lambda) B(\lambda, T_a) + (1-\rho_b(\lambda)) B(\lambda, T_b). \tag{2}$$

wherein $\rho_b$, $T_a$, $T_b$, are reflectance of the background materials, the temperature of the air, and the temperature of the background materials, respectively. Thus, the background radiance may include contributions from atmospheric radiance reflected off the background as well as radiance directly emitted by the background. The background in some instances may be a wall or sky or any other object.

For a single-band or multi-band OGI system, the detected radiance for an individual band may be expressed as given in Eqn. (3):

$$L_{detected} = \int \tau_{filter}(\lambda) s_{sensor}(\lambda) L(\lambda) d(\lambda) \tag{3}$$

where $\tau_{filter}$ is the filter transmittance spectrum and $s_{sensor}$ is the sensor spectral sensitivity, and the integration is over the wavelength range of the band. When simulating the detected radiance, the sensor spectral sensitivity may be set to one for convenience.

FIGS. 5A and 5B provide examples of the simulated radiance ratio, $L_{off\_active}/L_{off\_reference}$, wherein the subscript "off" refers to no gas presence, for a range of background temperatures, $T_b$, various temperature differences between ambient air and the background materials, $\Delta T_{ab}$, between the active band and the reference band, and two values of background reflectance, $\rho_b$=0.1 (FIG. 5A) and $\rho_b$=0.9 (FIG. 5B). The two active bands, band 1 (510, 511) and band 2 (520, 521), are shown for a range of temperature differences $\Delta T_{ab}$ such that the greater temperature differences appear at the top of each curve 510, 511, 520, 521.

In one or more embodiments, machine learning may be performed on the simulated data as in FIG. 5A and FIG. 5B to derive an analytical model relating an $n^{th}$ active band radiance and a reference band radiance. Examples of machine learning include regressions, including linear regressions, and neural networks. In one or more embodiments, the analytical model may be given by Eqn. (4):

$$L_{off\_active(n)} = [C_0 + C_1 \cdot T_b + C_2 \cdot (\rho_b \Delta T_{ab})] \cdot L_{off\_ref} \tag{4}$$

where C0, C1, and C2 are model parameters obtained through machine learning of the simulated data.

FIG. 6 presents an analytical model-estimated background radiance according to one or more embodiments for the two active bands (band 1 (610) and band 2 (620)) based on the reference band radiance, compared with numerical results based on Planck's law, under different materials and environmental conditions as those used in the learning data.

In one or more embodiments, a gas signal parameter $\Delta L$ is defined as given in Eqn. (5):

$$\Delta L = L_{off} - L_{on} \tag{5}$$

for each active band, where $L_{off}$ is the estimated background radiance in the active band and $L_{on}$ is the detected radiance with gas present in the active band. The relative ratio of $\Delta L$ between the two active bands (i.e., $\Delta L_{band1}/\Delta L_{band2}$) may then be used as a signature parameter to differentiate target gas from false alarm species (i.e., contaminant species) by comparing the signature parameter to a pre-set species differentiation threshold value.

A species differentiation threshold value for the differentiation signature parameter may need to be pre-set in the OGI system for each concerned false alarm species. These species differentiation threshold values may be obtained through theoretical simulations or experimental calibrations.

Figure 7:
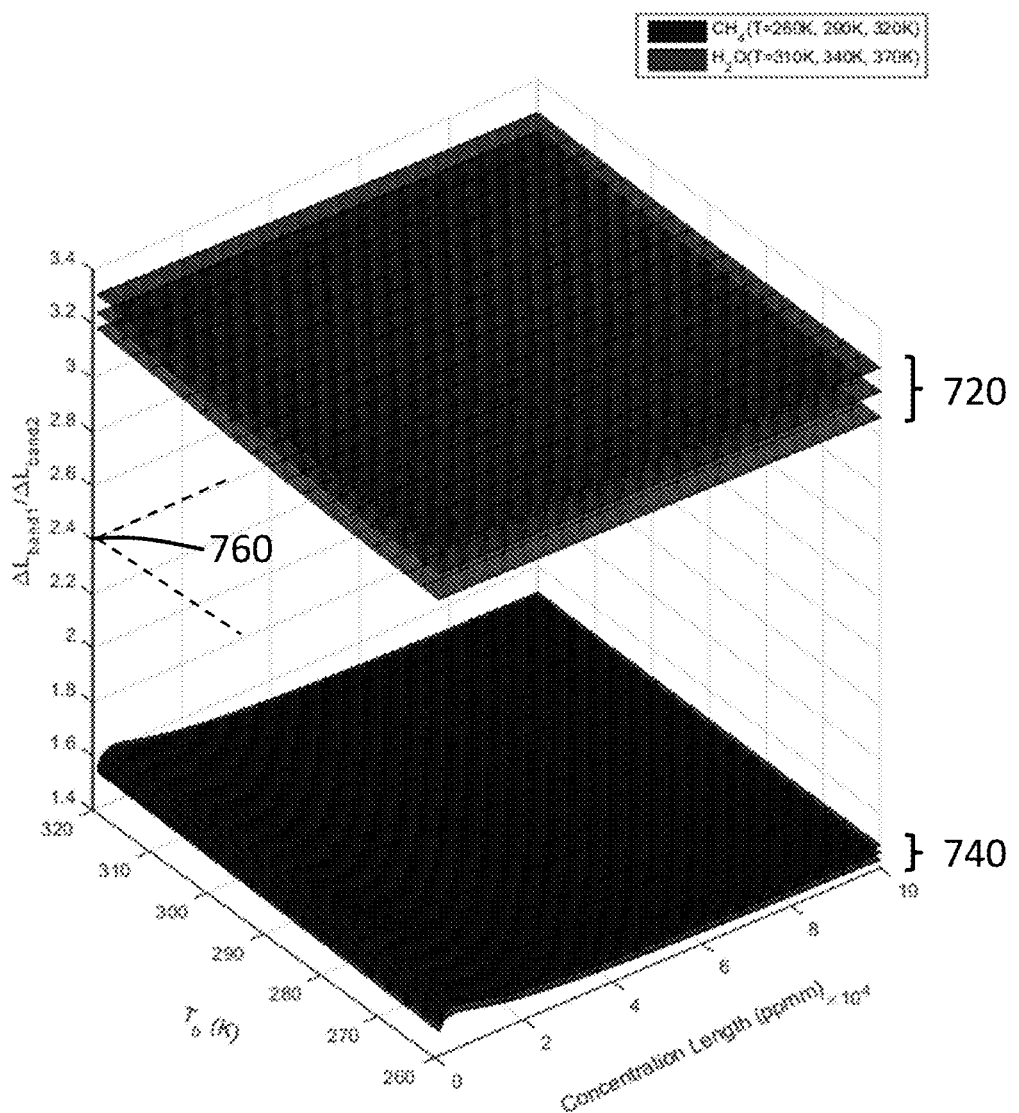
FIG. 7 shows simulated differentiation signature signals for methane and water vapor in accordance with one or more embodiments of the invention.

FIG. 7 shows the simulated values of $\Delta L_{band1}/\Delta L_{band2}$ of methane 740 and water vapor 720 for a wide range of gas concentrations and environmental conditions, in this example, background temperature $T_b$, and temperature of the gas species T, based on the selected three-band configuration of FIG. 4, and the corresponding example species differentiation threshold of 2.4 (760) for differentiating methane 740 and water vapor 720.

In one or more embodiments of the present invention, a gas concentration-length quantification system may include an OGI camera 30 connected to a processor 102. The processor 102 may perform one or more of the variations of the gas concentration-length method presented above to provide a gas concentration-length, a background radiance estimation, and/or reduce false alarms.

In one or more embodiments, the processor may be integrated into a computing device. The computing device may be a mobile computer device (e.g., smart phone, tablet computer, laptop, e-reader, etc.), a desktop personal computer (PC), a kiosk, a server, a mainframe, a cable box, or the like. Each computing device may be operated by a user and may utilize one or more graphical user interfaces (GUIs) to generate requests from the user to calculate a gas concentration-length, a background radiance estimation, and/or a background temperature estimation and/or display information to the user. The user requests may specify an output location (e.g., display device, storage location, printer, etc.) for calculated data. In one or more embodiments, various components of a computing device may be combined to create a single component. Similarly, the functionality performed by a single component may be performed by two or more components.

In one or more embodiments, the computing device may include a plurality of computing devices that are connected.

In one or more embodiments, the OGI camera may also be integrated into the computing device.

One or more images acquired by an infrared (IR) optical gas imaging (OGI) camera may be transferred to at least one of the user computing devices for processing and storing.

In one or more embodiments, the gas concentration-length quantification system may include a predetermined background radiance calculation model. The model may be stored in the camera, in the computer system, accessed via the network, accessed via an input device, or made available to the system by any other means.

In one or more embodiments, the gas concentration-length quantification system may use the predetermined background radiance calculation model to calculate the background radiance for an active band—with or without the presence of a target gas—based on environmental and/or background materials parameters and the measured radiance in a reference band. The parameters may be input by a user.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), performs one or more embodiments of the invention. Also, all discussed steps performed by a processor executing software instructions may, in one or more embodiments, be in the form of hardware such as circuitry. Those skilled in the art will appreciate that the hardware may be comprised of application-specific integrated circuits or other appropriate circuitry.

Further, one or more elements of the aforementioned computing device may be located at a remote location and connected to the other elements over a network. Further, one or more embodiments of the invention may be implemented on a distributed system having a plurality of nodes, where each portion of the invention may be located on a different node within the distributed system. In one or more embodiments of the invention, the node corresponds to a distinct computing device. Alternatively, the node may correspond to a processor with associated physical memory. The node may alternatively correspond to a processor or micro-core of a processor with shared memory and/or resources.

In one or more embodiments, a non-transitory computer readable medium (CRM) may store computer readable program code embodied therein that reads an image comprising, estimates a background radiance, calculates a gas concentration-length, and triggers an alert when the gas concentration-length exceeds a gas threshold level. Estimating the background radiance may include getting user input of environmental and background materials parameters and using a background radiance calculation model saved in the CRM to calculate the background radiance for an active band—with or without the presence of a target gas—based on environmental and/or background materials parameters and the measured radiance in a reference band.

Although one or more embodiments of the present invention have been described with reference to the infrared portion of the spectrum, one skilled in the art will readily recognize that the method disclosed in the present invention may also be applied to radiation of other wavelengths.

While the invention has been described with respect to a limited number of embodiments, those skilled in the art, having benefit of this disclosure, will appreciate that other embodiments can be devised without departing from the scope of the invention as disclosed herein. Accordingly, the scope of the invention should be limited only by the attached claims.

What is claimed is:

1. A gas concentration-length quantification method, comprising:
    acquiring a single multi-spectral image of detected radiance using a multi-spectral optical gas imaging (OGI) camera, the single multi-spectral image comprising a plurality of pixels;
    estimating a background radiance from one pixel of the plurality of pixels;
    calculating a gas concentration-length for the one pixel based on the detected radiance and the estimated background radiance; and
    triggering an alert when each alert condition in a list of alert conditions is satisfied, the list of alert conditions comprising the gas concentration-length for the one pixel exceeding a gas threshold level,
    wherein a multi-spectral configuration of the multi-spectral OGI camera includes a reference band that is outside an absorption window of a target gas and an active band that includes at least a portion of the absorption window of the target gas, and
    wherein estimating the background radiance comprises:
        determining a model relating a detected radiance of the active band to a detected radiance of the reference band, and
        using the model as a calibration model to estimate the background radiance for the active band with or without the presence of a target gas.

2. The method according to claim 1, wherein the single multi-spectral image is an infrared image and is acquired by the multi-spectral OGI camera sensitive to infrared radiation.

3. The method according to claim 1, wherein the spectral range is $3\times10^{-6}$ m to $5\times10^{-6}$ m.

4. The method according to claim 1, wherein the spectral range is $7\times10^{-6}$ m to $14\times10^{-6}$ m.

5. The method according to claim 1, wherein the background radiance is estimated with simulated data but not experimental data.

6. The method according to claim 1, wherein the model is an analytical model that is determined using machine learning, machine learning comprising regressions and neural networks.

7. The method according to claim 6,
    wherein the machine learning is performed on at least one of simulated and experimentally measured data,
    wherein the simulated data is based on simulation that is performed based on at least one member from a list consisting of known air temperature, background temperature, background reflectivity, and Planck's law, and
    wherein the experimentally measured data is based on experimental measurement that includes measuring at least one member from a list consisting of reflectance of background materials, emissivity of background materials, temperature of the background materials, temperature of the air, temperature difference between the background materials and the air, and sunlight condition.

8. The method according to claim 1,
wherein the multi-spectral configuration includes a plurality of active bands,
wherein the active bands and the reference band are determined using a plurality of longpass filters equal in number to the number of active bands plus one,
wherein each of the active bands includes the reference band, and
wherein the plurality of active bands comprises a first active band, wherein the first active band is a first difference between a first longpass filter and a reference longpass filter of the plurality of longpass filters.

9. The method according to claim 8, the method further comprising:
differentiating between a target gas and a contaminant gas; and
recording each pixel that crosses a species differentiation threshold as a false alert pixel,
wherein a second active band comprises a second difference between a second longpass filter and the reference longpass filter of the plurality of longpass filters,
wherein differentiating between a target gas and a contaminant gas comprises comparing a differentiation signature parameter to the species differentiation threshold, the differentiation signature parameter being the ratio $\Delta L_{1st\_active\_band}/\Delta L_{2nd\_active\_band}$ with $\Delta L$ being the difference between $L_{off}$, the estimated background radiance in one of the active bands in the plurality of active bands, and $L_{on}$, the detected radiance with gas present in the one active band, and
wherein the list of alert conditions further comprises each pixel with the gas concentration-length greater than the gas threshold that is not a false alert pixel.

10. The method according to claim 5, wherein the contaminant gas is water vapor.

11. The method according to claim 1, wherein the target gas is a hydrocarbon gas.

12. The method according to claim 7, wherein the hydrocarbon gas is methane.

13. A gas concentration-length quantification system, comprising:
a multi-spectral optical gas imaging (OGI) camera; and
a processor connected to the multi-spectral OGI camera,
wherein the processor performs:
reading a single image comprising a plurality of pixels;
estimating a background radiance from one pixel of the plurality of pixels;
calculating a gas concentration-length for the one pixel based on the single image and the background radiance; and
triggering an alert when the gas concentration-length for the one pixel exceeds a gas threshold level,
wherein a multi-spectral configuration of the multi-spectral OGI camera includes a reference band that is outside an absorption window of a target gas and an active band that includes at least a portion of the absorption window of the target gas, and
wherein estimating the background radiance comprises:
determining a model relating a detected radiance of the active band to a detected radiance of the reference band, and
using the model as a calibration model to estimate the background radiance for the active band with or without the presence of a target gas.

14. The system according to claim 13, wherein the single image is an infrared image and is acquired by the multi-spectral OGI camera sensitive to infrared radiation.

15. The system according to claim 13, wherein the model is an analytical model that is determined using machine learning, machine learning comprising regressions and neural networks.

16. The system according to claim 13,
wherein the multi-spectral configuration includes a plurality of active bands,
wherein the active bands and the reference band are determined using a plurality of longpass filters equal in number to the number of active bands plus one,
wherein each of the active bands includes the reference band, and
wherein the plurality of active bands comprises a first active band, wherein the first active band is a first difference between a first longpass filter and a reference longpass filter of the plurality of longpass filters.

17. The system according to claim 15,
wherein the machine learning is performed on at least one of simulated and experimentally measured data,
wherein the simulated data is based on simulation that is performed based on at least one member from a list consisting of known air temperature, background temperature, background reflectivity, and Planck's law, and
wherein the experimentally measured data is based on experimental measurement that includes measuring at least one member from a list consisting of reflectance of background materials, emissivity of background materials, temperature of the background materials, temperature of the air, temperature difference between the background materials and the air, and sunlight condition.

18. The system according to claim 16, the processor further performs:
differentiating between a target gas and a contaminant gas; and
recording each pixel that crosses a species differentiation threshold as a false alert pixel,
wherein a second active band comprises a second difference between a second longpass filter and the reference longpass filter of the plurality of longpass filters,
wherein differentiating between a target gas and a contaminant gas comprises comparing a differentiation signature parameter to the species differentiation threshold, the differentiation signature parameter being the ratio $\Delta L_{1st\_active\_band}/\Delta L_{2nd\_active\_band}$ with $\Delta L$ being the difference between $L_{off}$, the estimated background radiance in one of the active bands in the plurality of active bands, and $L_{on}$, the detected radiance with gas present in the one active band, and
wherein the list of alert conditions further comprises each pixel with the gas concentration-length greater than the gas threshold that is not a false alert pixel.

19. A non-transitory computer readable medium (CRM) storing computer readable program code embodied therein that:
reads a single image comprising a plurality of pixels;
estimates a background radiance from one pixel of the plurality of pixels;
calculates a gas concentration-length for the one of pixel based on the single image and the background radiance; and
triggers an alert when the gas concentration-length for the one pixel exceeds a gas threshold level, wherein a multi-spectral configuration of a multi-spectral OGI camera includes a reference band that is outside an absorption window of a target gas and an active band that includes at least a portion of the absorption window of the target gas, and wherein estimating the background radiance comprises:
determining a model relating a detected radiance of the active band to a detected radiance of the reference band, and using the model as a calibration model to estimate the background radiance for the active band with or without the presence of a target gas.

20. The CRM according to claim 19, wherein the single image is an infrared image and is acquired by an optical gas imaging camera sensitive to infrared radiation.

21. The CRM according to claim 19, wherein the model is an analytical model that is determined using machine learning, machine learning comprising regressions and neural networks.

22. The CRM according to claim 19,
wherein the multi-spectral configuration includes a plurality of active bands,
wherein the active bands and the reference band are determined using a plurality of longpass filters equal in number to the number of active bands plus one,
wherein each of the active bands includes the reference band, and
wherein the plurality of active bands comprises a first active band, wherein the first active band is a first difference between a first longpass filter and a reference longpass filter of the plurality of longpass filters.

23. The CRM according to claim 21,
wherein the machine learning is performed on at least one of simulated and experimentally measured data, wherein the simulated data is based on simulation that is performed based on at least one member from a list consisting of known air temperature, background temperature, background reflectivity, and Planck's law, and wherein the experimentally measured data is based on experimental measurement that includes measuring at least one member from a list consisting of reflectance of background materials, emissivity of background materials, temperature of the background materials, temperature of the air, temperature difference between the background materials and the air, and sunlight condition.

24. The CRM according to claim 21, the program code further:
differentiates between a target gas and a contaminant gas; and
records each pixel that crosses a species differentiation threshold as a false alert pixel,
wherein a second active band comprises a second difference between a second longpass filter and the reference longpass filter of the plurality of longpass filters,
wherein differentiating between a target gas and a contaminant gas comprises comparing a differentiation signature parameter to the species differentiation threshold, the differentiation signature parameter being the ratio $\Delta L_{1st\_active\_band}/\Delta L_{2nd\_active\_band}$ with $\Delta L$ being the difference between $L_{off}$, the estimated background radiance in one of the active bands in the plurality of active bands, and $L_{on}$, the detected radiance with gas present in the one active band, and
wherein the list of alert conditions further comprises each pixel with the gas concentration-length greater than the gas threshold that is not a false alert pixel.

* * * * *